March 17, 1970  B. B. BEEKEN  3,500,951
ACOUSTICAL INTERFEROMETRIC SENSING DEVICE
Filed April 22, 1968  5 Sheets-Sheet 1
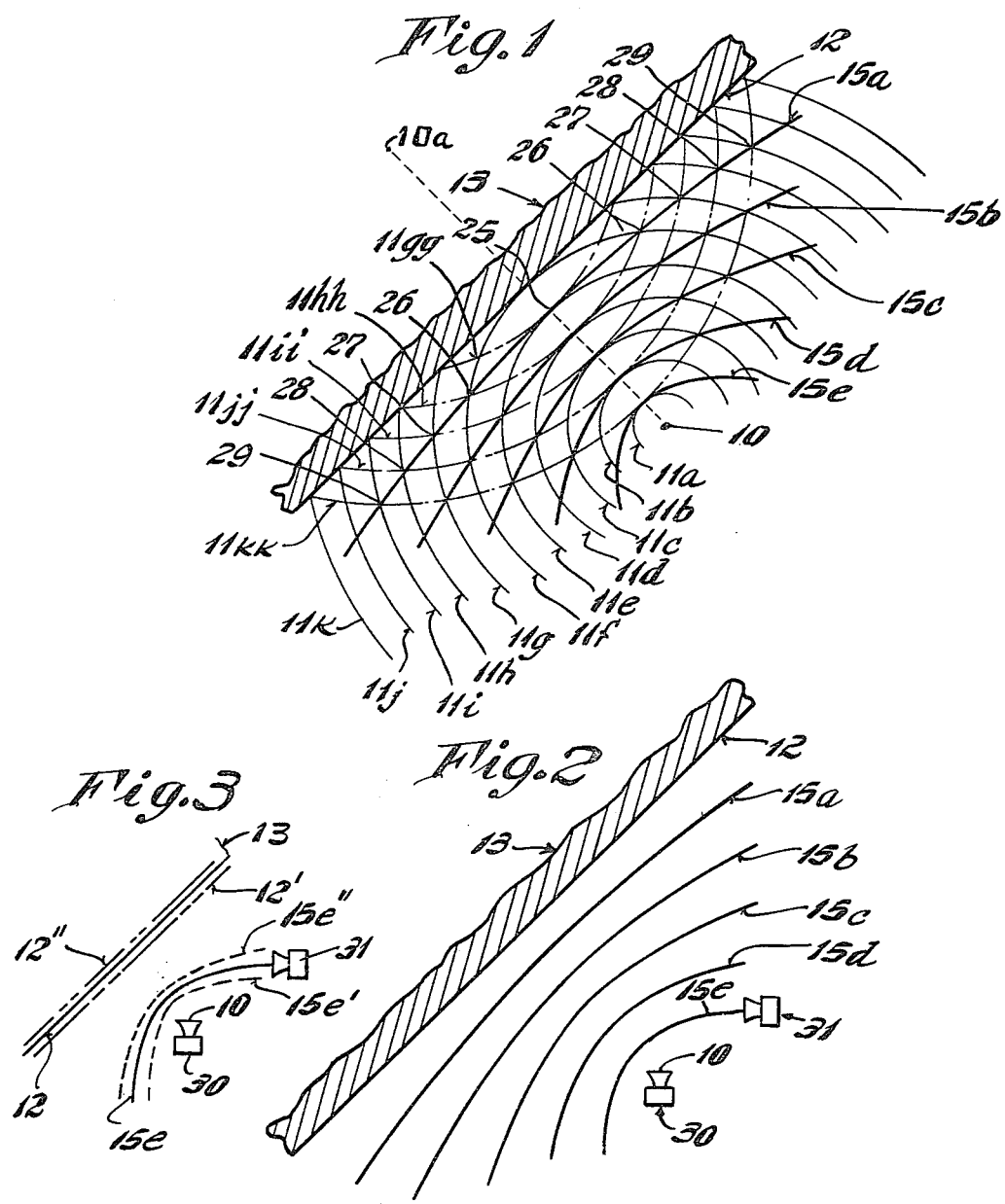
INVENTOR.
Basil B. Beeken
BY
Albert W. Scribner
ATTORNEY

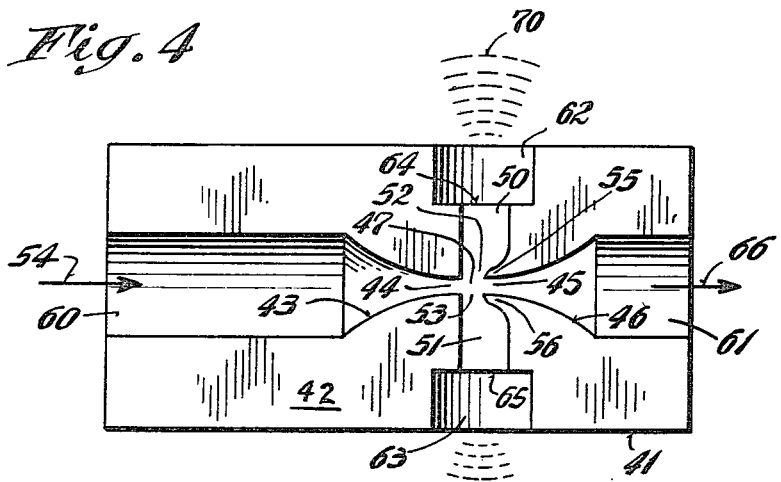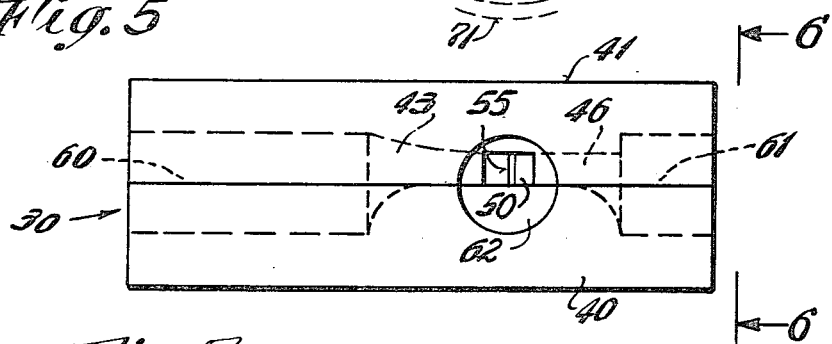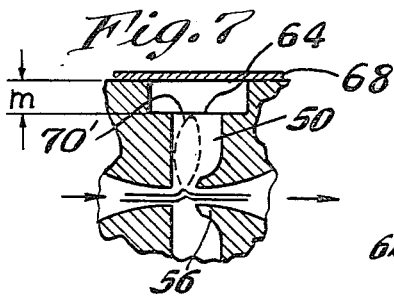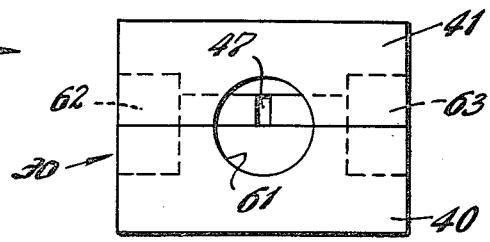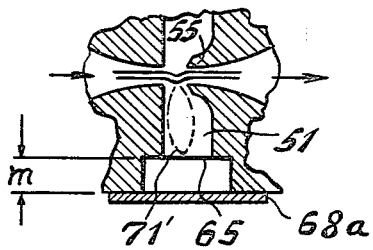
INVENTOR.
Basil B. Beeken
BY
ATTORNEY

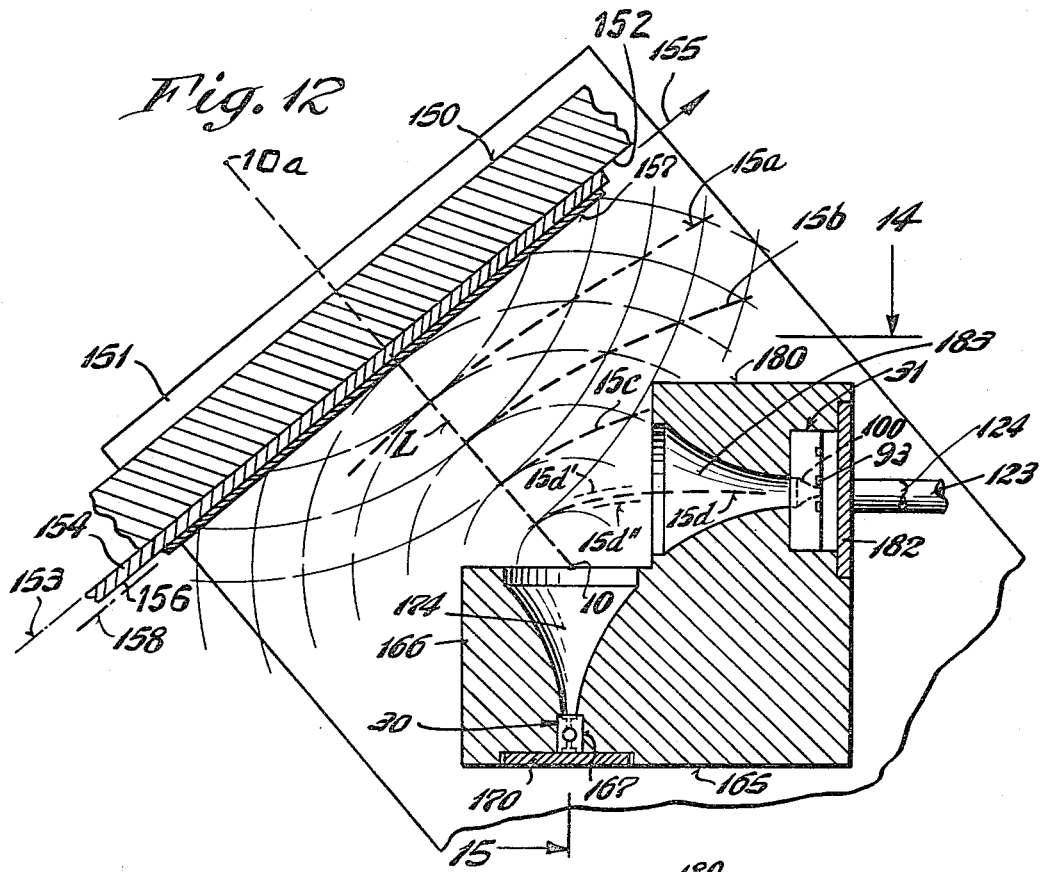

United States Patent Office 3,500,951
Patented Mar. 17, 1970

3,500,951
ACOUSTICAL INTERFEROMETRIC SENSING DEVICE
Basil B. Beeken, New Haven, Conn., assignor to Pitney-Bowes, Inc., Stamford, Conn., a corporation of Delaware
Filed Apr. 22, 1968, Ser. No. 722,886
Int. Cl. G10k 5/00; F15c 1/04, 4/00
U.S. Cl. 181—.5                    24 Claims

ABSTRACT OF THE DISCLOSURE

An acoustical interferometer including a generator that is adapted to direct ultra-sonic waves against the surface of an object to be sensed whereby the incident and reflected waves to and from said surface establish a predetermined pattern of interference fringes when said surface is in a predetermined position relative to said generator. An acoustically sensitive device is operatively located so as to be controlled by a predetermined one of said fringes whereby said device may precisely determine when said surface is in its said predetermined position.

---

This invention relates to a novel acoustical interferometer. More particularly the invention relates to a novel interferometer for establishing acoustical interference fringes that are adapted to control the operation of an acoustically sensitive fluidic device.

Several fluid types of sensing devices, some utilizing transducers, have been proposed for use in conjunction with fluidic circuits and elements. These devices are generally used for sensing simply the presence of various objects such as sheets, or general mechanical elements including limit stops, trigger fingers, etc.; and in many cases make use of fluid jets, optical means, sound waves and the like. As useful as they may be for general purposes, such conventional sensing devices fall far short of making possible any very precise measurements in applications where the necessary accuracy of linear measurement is in the order of plus or minus one or two thousandths of an inch. The instant invention contemplates the provision of a precise acoustical measuring technique and arrangement whereby a pattern of ultra-sonic interference fringes is established in conjunction with a surface of an item to be sensed, and a portion of this interference fringe pattern is then acoustically sensed in order to determine a positional characteristic of said surface.

One object of the instant invention is to provide a novel acoustical interferometer that is relatively inexpensive to produce yet is capable of affording very accurate measurements.

Another object of the invention is to provide a novel acoustical interferometer that is very rugged and compact and is readily applied to a wide variety of environments wherein precise dimensional or other measurements are to be made.

Another object of the invention is to provide a novel acoustical sensing device wherein a relative location of a surface may be simply, quickly and accurately determined.

Another object of the instant invention is to provide a novel acoustical interferometer having substantially no moving parts.

A further object of the invention is to provide a novel acoustical method and apparatus for accurately determining the positional characteristic of a predetermined surface of an object.

Other objects of the invention will become apparent as the disclosure progresses. In the drawings:

FIGURE 1 is a diagrammatic view illustrating the nature of a set of acoustical interference fringes.

FIGURES 2 and 3 are diagrammatic views illustrating the sensing technique and system of the instant invention.

FIGURE 4 is a plan view of the grooved plate of a whistle assembly illustrated in FIGURE 5.

FIGURE 5 is a side elevational view of the upper and lower plate assembly of the instant acoustical wave generating means.

FIGURE 6 is an end view of the apparatus of FIGURE 5 as indicated by the view line 6—6 of FIGURE 5.

FIGURES 7 and 8 are fragmentary views diagrammatically illustrating the nature of fluid flow through the main portion of the instant wave generating means.

FIGURE 12 is a plan view of the combination of means arranged for operation in the instant sensing system.

FIGURE 13 is a perspective view illustrating the general construction of the mounting block for the instant wave generating means and the acoustically sensitive means.

Figure 9:
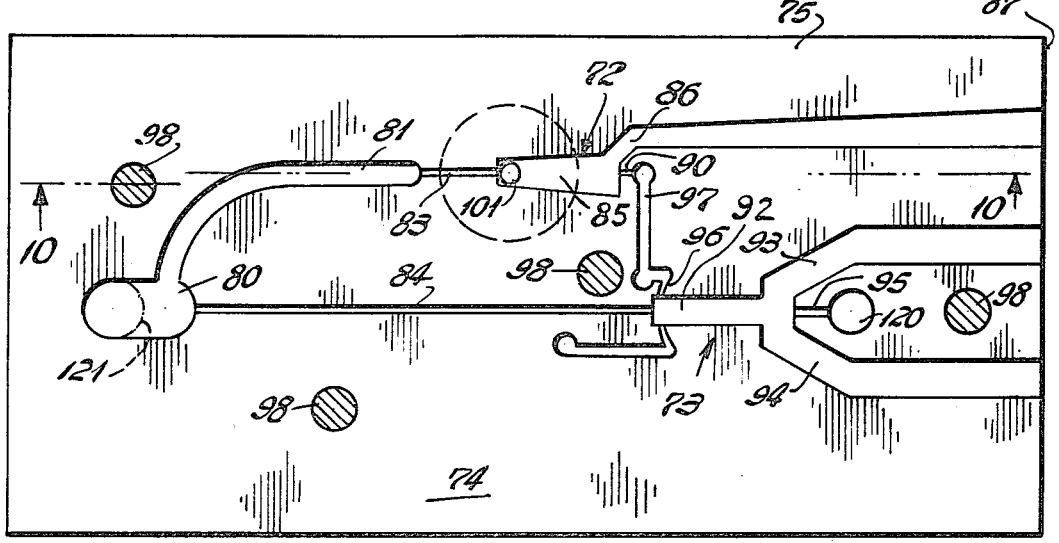
FIGURE 9 is a detailed plan view of the grooved circuit board comprising a portion of the instant acoustically sensitive means.

A discussion of the general technique involved in the instant invention will be first made in connection with FIGURES 1–3. Referring to FIGURE 1 there is shown a series of acoustical waves that establishes a plurality of interference fringes. Here a positionally fixed source 10 of ultra-sonic wave energy is adapted to generate acoustical waves whose successive maximum amplitude modes are designated by the enlarging series of concentric circles 11a, 11b, 11c, 11d, etc. These generated waves propagate spherically outwardly until they impinge on the surface 12 of an object 13 and are reflected and continue their spherical propagation as indicated by the continuing enlarging series of concentric circles 11gg, 11hh, 11ii, 11jj, etc. The reflected waves 11gg, 11hh, etc., will be coherent with and 180 degrees out of phase with respect to the incident waves 11a, 11b, etc. These reflected waves may be considered to originate from an imaginary point source 10a that is located the same distance from surface 12 as is said point 10. Under these conditions the coherent incident and reflected acoustical waves will interfere with one another and establish a well-defined pattern of interference fringes designated by the lines 15a, 15b, 15c, 15d, etc. Each such fringe is effectively defined by the intersection of the circles defining the incident and reflected waves; for example, fringe 15a is effectively defined by a locus of points, including 25, 26, 27, 28, 29, etc., which represent the intersection of the incident wave circles 11e, 11f, 11g, 11h, and 11i, with reflected wave circles 11gg, 11hh, 11ii, 11jj, and 11kk respectively. In that these circles respectively indicative of the maximum amplitude or displacement of the wave fronts, the noted fringes 15a, 15b, etc., will constitute null fringes wherein substantially complete destructive interference occurs. When the point source 10 and the surface 12 are positionally fixed relative to one another, said fringes will also be fixed in the region adjacent said source 10 and surface 12. The mechanics of such wave interference are well understood in the field of wave motion and hence need not, per se, be discussed in detail here except to the extent that such are pertinent to the instant invention.

Referring to FIGURE 2 the point source 10 and the interference fringes 15a, 15b, 15c, 15d and 15e are again shown together with the surface 12 of said object 13. Also illustrated is an acoustical wave generating means 30 that is adapted to generate acoustical waves such as those illustrated at 11a, 11b, etc., of FIG. 1 in such a manner as to effectively define a point source 10. These generated acoustical waves will have frequencies in the ultra-sonic range and preferably in the order of 20,000 to 100,000 cycles per second. An acoustically sensitive device 31 is shown located in a fixed position along the interference fringe 15e, this device being adapted to be controlled by the presence or absence of the said fringe 15e. When the acoustical wave generating means 30, the surface 12, and acoustically sensitive device 31 are in the said predetermined fixed relative positions, as illustrated in FIGURE 2, the acoustical interference fringe 15e will cause the acoustical sensitive device 31 to be placed in a first operative condition. When however the surface 12 is displaced so as to be nearer or farther away from the said source 10 as indicated by reference numerals 12′ and 12″ of FIG. 3, then the fringe 15e will be accordingly moved nearer or farther away from its FIG. 2 position as is illustrated in FIG. 3 by the dotted fringe lines 15e′ and 15e″ respectively. When the said surface 12 is thus not in its predetermined FIG. 2 position relative to the means 30 and the device 31, the interference fringe corresponding to fringe 15e will not be operatively aligned with said acoustically sensitive device 31 and the latter will assume a second operative condition, as will be described in detail below. Only very slight displacements (in the order of less than two thousandths of an inch) of the surface 12 away from the FIG. 2 position will cause the fringe to be relocated, as illustrated by said dotted lines in FIG. 3, to such effectively inoperative positions whereby the acoustically sensitive device 31 assumes its said second operative condition. It will be apparent from the above discussion that when locating the elements 30, 31 in their predetermined FIG. 2 positions, and moving surface 12 towards its FIG. 2 position, it may be very precisely determined when said surface 12 is located in its FIG. 2 position by detecting when the acoustically sensitive device 31 is switched from its said second to its said first operative condition. This technique and arrangement can thus be used in a wide variety of environments where very accurate measurements are to be made.

A detailed description of the structural aspects of the instant apparatus will now be made in connection with FIGS. 4–17; FIGS. 4, 5 and 6 being referred to first in regard to the construction and operation for one embodiment of the said acoustical wave generating means 30. The means 30 is effectively defined by a high frequency whistle comprising essentially a grooved lower plate 40 and a cooperating grooved upper plate 41 as is illustrated in FIG. 5; the plates being assembled in mutually sealed relation by any suitable means well known in the art. The face 42 of the upper plate 41 is grooved so as to effectively define the fluid conducting channels of the instant whistle. As may be seen from FIG. 4 the whistle generally comprises a venturi restriction which cooperates with a pair of laterally adjacent and communicating resonating chambers. More specifically the plate surface 42 is formed with a convergent inlet groove 43, the walls forming the downstream end of said groove 43 defining a throat 44 that is aligned with another throat 45 defined by the upstream end of a divergent groove 46. The grooves 43 and 46 cooperatively define said venturi restriction. The throats 44 and 45 have substantially the same rectangular cross-sectional shape and area and are mutually axially juxtaposed. The region 47 between said throats has associated there- with a pair of similar laterally extending resonating chambers or grooves 50 and 51, these two resonating chambers having rectangular cross-sections and respectively communicating with said region 47 through openings 52 and 53. The width of the openings 52, 53 measured in the direction of fluid flow 54, is less than that for the laterally more remote portions of the chambers 50, 51, this reduction in the said width of openings 52 and 53 being effectively due to the upstream extending projections 55 and 56 that, inter alia, at least partially define the said throat 45. The bottom of grooves 43, 46, 50 and 51 and the region 47 are substantially coplanar. The mutually contacting faces of the plates 40 and 41 are further grooved so as to form circular cross-sectional channels 60, 61, 62 and 63 that communicate respectively with said grooves 43, 46, 50 and 51; such channels facilitating the coupling of the fluid conducting passages of the whistle with any desired external tubing, wave guides and the like. The effective lengths of the rectangular cross-sectioned resonating chambers 50, 51 as measured from the openings 52, 53 to the effective outer ends 64 and 65 thereof respectively, are each equal to one-half (or multiple thereof) of the wave length of the sound waves generated by the whistle 30. FIGS. 4, 5 and 6 are substantially to scale and in one model of the instant whistle the width of each throat 44, 45 as viewed in FIG. 4, was made approximately .020 of an inch, while the depth of each such throat, as viewed in FIG. 6, was made approximately .040 of an inch: this model generating wave frequencies in the neighborhood of 50,000 Hertz.

In operation air or other fluid under pressure is introduced into the groove 43, as indicated by arrow 54 of FIG. 4, so as to cause a fluid jet to issue from said throat 44 and flow across said region 47 and into the throat 45. From throat 45 the fluid exhausts, as indicated by arrow 66, out through the diffuser groove 46 which is divergently flared as shown so as to reduce the fluid flow impedance in this region of the whistle. Due to the above-described whistle geometry as the fluid jet passes through region 47 between the throats 44 and 45 it will laterally oscillate in said region in accordance with the well-known "Edgetone Effect." It is believed that the illustrated and described location of the upstream tips of said projections 55 and 56 causes at least a portion of the fluid jet from throat 44 to be slightly flexed first upwardly, as shown in FIG. 7, and then downwardly, as shown in FIG. 8; these flexures being somewhat exaggerated in FIGS. 7 and 8 for the sake of visualization. This periodic transverse oscillation of a portion of the fluid jet acts like a vibrating reed and initiates acoustical waves in the resonating chambers 50 and 51 as is indicated at 70 and 71, FIG. 4. Due to the fact that the effective length of each of said chambers 50, 51 (that is the distances from openings 52 and 53 to the respective outer ends 64 and 65 of said chambers) is one-half (or multiples thereof) of the wave length of the sound waves generated by the whistle either one of said chambers may be effectively blocked off as is illustrated at 68 and 68a, FIGS. 7 and 8, in which case the standing acoustical waves in this one blocked off chamber will reinforce the waves generated in and leaving the other of said chambers as is diagrammatically illustrated at 70′ and 71′ of FIGS. 7 and 8. The effective depth $m$, FIGS. 7 and 8, of channels 62 and 63 is such that the elements 68 and 68a reflected the sound waves so that the latter arrive in phase with the emission at 64 and 65 respectively. The said depth $m$ will have a magnitude in the order of approximately one-quarter of the wave length of the sound waves generated by the instant whistle.

The structural and functional details for the acoustically sensitive device 31, FIGS. 2 and 3, will now be described in connection with FIGS. 9, 10 and 11. The device 31 essentially comprises a two-stage fluidic circuit that includes two fluid amplifiers 72 and 73. These two fluid amplifiers are formed by appropriately grooving the upper surface 74 of a main circuit board 75, this grooved surface then being covered and sealed by a suitable cover plate 76, FIGURE 10, in a manner well understood in the art. The specific fluidic circuit defined by said grooved surface is illustrated in FIGURE 9 and comprises a fluid supply inlet groove 80 that is formed in the board surface 74, which inlet groove communicates through a suitable groove 81 with the emitter groove or channel 83 of said fluid amplifier 72, and also communicates directly with the emitter groove or channel 84 of amplifier 73. Amplifier 72 includes a slightly diverging (as viewed in FIGURE 9) groove 85 that defines an interaction chamber the upstream end of which communicates with said emitter channel 83 while the downstream end thereof communicates with an angularly extending venting channel 86 that extends longitudinally out through the end 87 of said circuit board 75. The downstream end of the interaction chamber also communicates with a collector groove or channel 90 that is coaxially aligned with and has substantially the same cross-sectional size and shape as said emitter groove 83. The amplifier 73 includes a widened groove 92 that defines an interaction chamber the upstream end of which communicates with an emitter groove 84 while the downstream end thereof communicates with venting channels 93 and 94, these two channels extending out through the said end 87 of circuit board 75. The downstream end of this interaction chamber also communicates with a collector groove or channel 95 that is coaxially aligned with and has substantially the same cross-sectional shape and size as said emitter groove 84. A control groove or channel 96 communicates at one end thereof with one side of the upstream end of said interaction chamber groove 92 while the other end thereof communicates with said collector groove 90 through a suitable channel 97.

Figure 10:
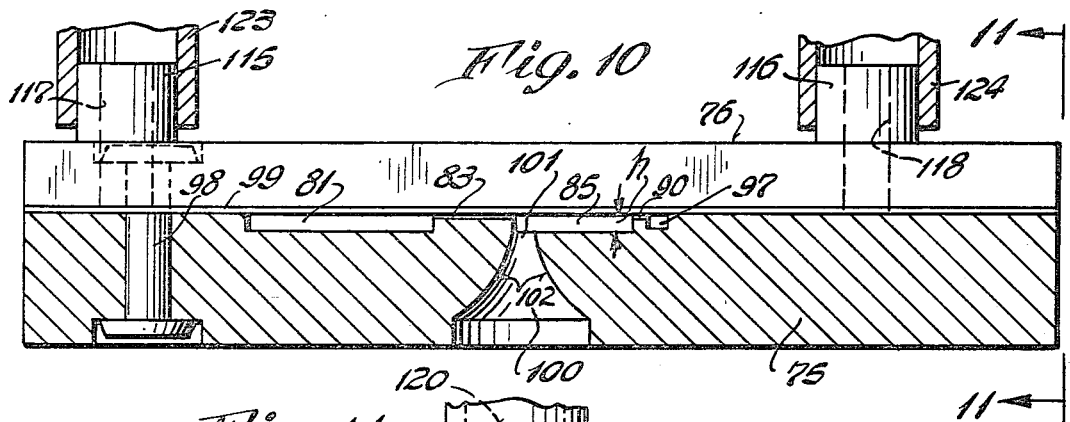
FIGURE 10 is a side elevational view in partial section and includes the apparatus shown in FIGURE 9, the grooved circuit board being shown in section as taken along section line 10—10 of FIGURE 9.
Figure 11:
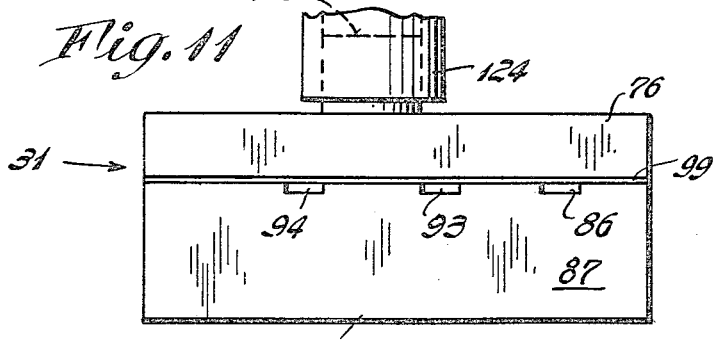
FIGURE 11 is an end view of the apparatus of FIGURE 10 as indicated by the view line 11—11 of FIGURE 10.

As is illustrated in FIGURES 9 and 10 the depth $h$ (as seen in FIGURE 10) of the interaction chamber groove 85, the groove 81, and the venting groove 86 is considerably greater than that for the emitter groove 83 and collector groove 90 associated with this amplifier. In similar fashion the corresponding depth of groove 80, the interaction chamber groove 92 and venting channels 93, 94 of amplifier 73 is considerably greater than that for the emitter groove 84, the control groove 96 and collector groove 95 associated with said amplifier 73. The groove and channel configuration illustrated in FIG. 9 is approximately to scale; typical lengths for the interaction chamber grooves 85 and 92 each being in the order of five-sixteenths of an inch. One circuit board model has been constructed wherein the cross-sectional size of the emitter groove 83 was made approximately .007 inch "wide" and .007 inch "deep" while the cross-sectional size of the emitter groove 84 was made approximately .015 inch "wide" and .015 inch "deep." The cross-sectional sizes of collector grooves 90 and 95 were substantially the same as those for said emitter grooves 83 and 84 respectively. The above-noted dimensions represent only exemplary values and are not to be construed as being limiting values. When the cover plate 76 is sealingly secured to the circuit board 75, as by rivets 98 and gasket 99, or by other suitable means well-known in the art, the various above-described grooves and channels will have substantially rectangular cross-sectional profiles.

Amplifier 72 is provided with a control passage 100 which is formed through the circuit board 75 and which terminates at a small round port 101, FIG. 9, disposed along the bottom side, FIG. 10, of the upstream end of said interaction chamber groove 85. The side walls 102 defining the control passage 100 arcuately diverge so that said passage 100 defines an externally facing exponentially contoured (as seen in FIGURE 10) horn or sound wave receiving aperture. Integrally formed on the upper or outer side of said cover plate 76 is a pair of tubular fittings 115 and 116 that are provided with passages 117 and 118 that communicate, through suitable coextensive openings in the plate 76, with said fluid pressure supply groove 80 and said collector groove 95 respectively; the passage 118 communicating with a plate recess 120 that in turn communicates with said groove 95 of amplifier 73. The passage 117 communicates with the fluid supply groove 80 as is diagrammatically indicated by the phantom line 121 of FIG. 9.

Each of the amplifiers 72 and 73 is mono-stable in operation. The normal mode of operation of each amplifier is such that a laminar jet of fluid exists between the emitter and collector thereof whereby the pressure in said collector will be relatively high. When a suitable signal is applied to the amplifier the fluid flow in the laminar jet will become turbulent and this turbulent flow will for the most part exhaust through the associated amplifier vent grooves and the pressure in the collector will be relatively low. This turbulent mode of operation will persist until the said signal is removed whereupon the amplifier will immediately resume operating in its said normal laminar mode. The operation of the circuit board assembly of FIGURES 9 and 10 is as follows: assuming a fluid supply line, such as flexible tube 123, is operatively coupled to the supply inlet passage 80 fluid, such as air, from a suitable pressure source flows through both emitter channels 83 and 84 so that from the downstream end of each of said emitters there issues a laminar jet of fluid which is normally directed into the associated collector grooves 90 and 95 respectively. The resultant higher fluid pressures in the collector groove 85 of amplifier 72 however produces a control signal or fluid flow which passes through the control groove 96 of amplifier 73 to thereby cause the latter to assume a turbulent mode of operation. Here then with no effective signal reaching the control port 101 of the small amplifier 72 the state of operation of the circuit is such that amplifier 72 remains in its laminar mode while amplifier 73 remains in its turbulent mode operation. Under these conditions the pressure in the collector 95 of amplifier 73 and in the flexible output tube 124 coupled to collector 95 will be relatively low. When an effective acoustical signal is received through the control port 101 of amplifier 72 and impinges on said laminar jet issuing from emitter groove 83 this amplifier will be thereby switched to its turbulent mode wherein the flow in said laminar jet becomes turbulent and exhausts through said venting channel 86. The resulting pressure drop in collector 90 and the control groove 96 will cause amplifier 73 to switch to its laminar mode whereby the fluid pressure in collector 95 and output tube 124 will become relatively high. Upon said effective acoustical signal being terminated or removed from the said amplifier control port 101 the amplifiers 72 and 73 will immediately revert to their previously described laminar and turbulent modes respectively wherein the fluid pressure in output tube 124 will again be relatively low. It will be apparent then that the above-described apparatus of FIGS. 9–11 is an acoustically sensitive device wherein the fluid pressure in output line 124 is relatively low when no effective acoustical signal is received through the control port 101 and is relatively high when an effective acoustical signal is received through said port 101.

Referring now to FIGS. 12–16 there is shown a combination of parts that represent a practical application of the above-described technique and apparatus. Here a guide block 150 is fixed to a stationary horizontal base plate 151 by any suitable fastening means and is formed with a smooth flat vertical guide surface 152. Surface 152 defines a fixed datum plane 153 over which an object to be sensed may pass. For illustrative purposes let it be assumed here that the object to be sensed is a strip or a sheet 154 of material such as paper; the sheet being adapted to be held or biased against surface 152 by any suitable means and to be moved along the latter as indicated by arrow 155 of FIG. 12. The strip or sheet 154 has on the outer side 156 thereof a coating of film 157 which is to be monitored for continuity so as to determine if there are any coating gaps or any significant increases or decreases from a predetermined thickness of said film, the outer surface of the coating effectively defining a plane 158. Also fixedly mounted on the base plate 151 is an L-shaped block 165 which houses an acoustical wave generating means 30 that is similar to that described above in connection with FIGS. 4–8, and an acoustically sensitive device 31 that is similar to that described above in connection with FIGS. 9–11. In the leg 166 of block 165 there is formed a rectangular recess 167 and an acoustical wave generating means or whistle 30 similar to that described above is retained in said recess by a retainer plate 170 that is fastened by any suitable means (not shown) to the block 165. The block leg 166 is formed with a fluid inlet hole 171, FIG. 15, and an associated fluid conduit means 172 whereby fluid under pressure from a suitable pressure source may be directed into the inlet channel 60, FIG. 5, of the whistle. The block leg 166 is also formed with a fluid exhaust hole 173 which communicates with the divergent exhaust channel 61, FIG. 4, of said whistle. Said block leg 166 is further formed with a cone-like recess 174 that extends from the outer surface 175 of said block leg to the said recess 167, the reduced end of said cone-like recess 174 being disposed closely adjacent to and communicating with the end of the resonating chamber 50 of said whistle. It will be noted that the outer end of the other resonating chamber (51) is here blocked off by the said retaining plate 170 in the manner described above in connection with FIGS. 7 and 8.

Figure 14:
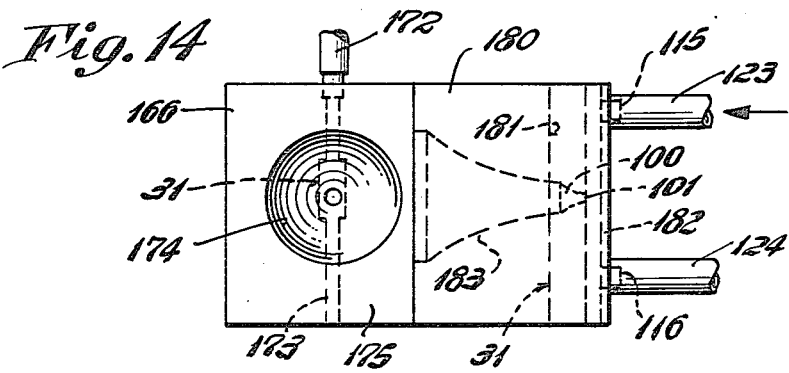
FIGURE 14 is a top view of the principal portions of the apparatus shown in FIGURE 13.
Figure 15:
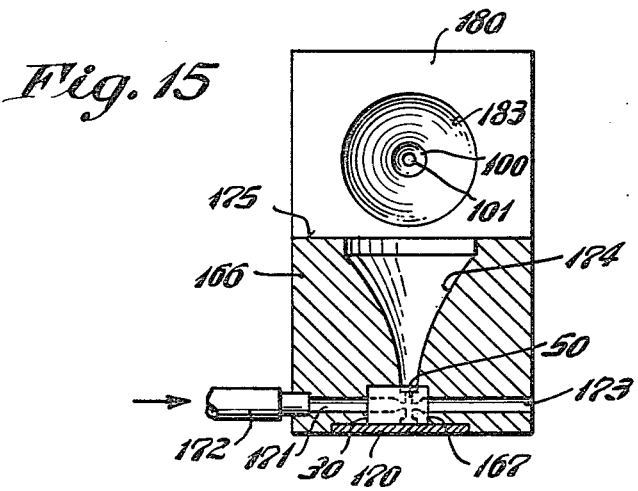
FIGURE 15 is a front view of the principal portions of the apparatus shown in FIGURE 13.

Through the rear side of the leg 180 of block 165 there is formed an elongated slot 181 in which is disposed an acoustically sensitive device 31 similar to that described above. Said device 31 is fixedly retained in slot 181 by a retainer plate 182 that is secured to the block leg 180 by any suitable fastening means not shown. The retainer plate 182 is formed with appropriate apertures to accommodate respectively the said fittings 115, 116 and flexible tubing 124, 123 associated with said acoustically sensitive device 31. The block leg 180 is further formed with a cone-like recess 183 that extends from the inner surface 184 thereof to the bottom of said slot 181. As is best seen in FIGS. 12 and 14 the inner end of the cone-like recess 183 is disposed closely adjacent to and communicates with the outer end of said control passage 100, FIG. 10, of the acoustically sensitive device 31.

As is best seen in FIG. 12 said base plate 151 mounts the guide block 150, the whistle 30 and the acoustically sensitive device 31 in predetermined mutually fixed positions on the base plate 151, the axes of the cone-like recesses 174 and 183 being disposed in a common plane and at substantial 90 degrees with respect to one another. The fixed position of guide block 150 relative to said elements 30, 31 is such that when the sheet 154 with the coating 157 thereon moves over said guide surface 152, the plane 158 of the outer surface of coating 157 will be located so as to correspond to the plane of the surface 12 described above in connection with FIGS. 1–3.

Figure 16:
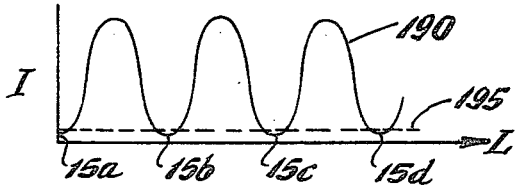
FIGURES 16 and 17 are diagrammatic views illustrating the operation of the control arrangement for the acoustically sensitive device of FIGURES 12–15.
Figure 17:
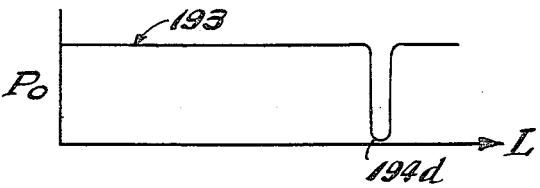

In the operation of the interferometer of FIGS. 12–15 the inlet or supply lines 172 and 123 of the whistle 30 and the acoustically sensitive device 31 respectively are connected to a suitable fluid pressure source. Fluid, preferably air, thus flows through said device 31 so that said fluid amplifiers 72 and 73 assume their above-described normal operating conditions wherein the fluid pressure in output line 124 is relatively low. Fluid will also flow through the whistle and thus generate ultra-sonic waves as above described, such waves passing out through the cone-like recess 174 and propagating outwardly through the surrounding medium from an effective point source 10. These waves will be reflected from said plane 158 of the said outer surface of the coating 157 so that the incident and reflected waves establish a fixed pattern of interference fringes 15a, 15b, 15c, 15d, in the manner similar to that described above in connection with FIGS. 1–3. The fixed position of guide block 150 is selected so that the said interference fringe 15d of FIG. 12 will extend through the cone-like recess 183, the passage 100 and the small control port 101 associated with the fluid amplifier 72 of the acoustically sensitive device 31. In that the interference fringe 15d represents a null line along which the net amplitude or acoustical intensity of the wave motion is substantially zero, the laminar flow of fluid in the fluid amplifier 72 will not be disturbed and hence the fluid pressure in the output line 124 from amplifier 73 will remain relatively low. This state of operation of the device 31 will persist as long as the thickness of the coating 157 on the moving strip or sheet 154 remains substantially uniform, i.e., so long as the position of said plane 158 remains in its FIG. 12 position. When however there is any significant increase or decrease in the thickness of film 157, i.e., when the plane 158 effectively moves in either direction away from its FIG. 12 position, the interference fringe 15d will be shifted to a displaced position such as is illustrated by fringe lines 15d' or 15d" of FIG. 12 and under these conditions the intensities or amplitudes of the acoustical wave energy reaching the said control port 101 of amplifier 72 will be great enough to disturb the laminar fluid flow in said amplifier 72 and hence the amplifiers 72 and 73 will be switched to their turbulent and laminar modes of operation respectively whereby the fluid pressure in said output line 124 will be relatively high. This increase in fluid pressure in the output line 124 will thus indicate that the plane 158 has been effectively displaced from its FIG. 12 position and that there is some improper discontinuity or variance in the predescribed thickness of film 157. (It is assumed here that the thickness of the sheet 154 per se is constant.) This control action is illustrated diagrammatically in FIGS. 16 and 17. In FIG. 16 the curve 190 illustrates the net intensity or amplitude (I) of the acoustical energy as measured at points along a line such as L of FIG. 12 or along any other line drawn radially from point 10. As will be apparent the lowermost points on the curve 190 correspond to the above-mentioned interference fringes such as 15a, 15b, 15c and 15d wherein the net intensity of the acoustical energy I is nearly zero. The line or curve 193 of FIG. 17 represents the fluid pressure (Po) in the said output line 124 of the acoustically sensitive device 31. As may be seen from FIG. 17, in conjunction with FIG. 16, the fluid pressure in said output line 124 will decrease sharply as at 194d whenever the intensity of said acoustical energy reaching control port 101 falls below that indicated by the dotted line 195 of FIG. 16, line 195 indicating the sensitivity level of said means 31. Thus said portion 194d of line 193 can be used as a control signal to indicate when the surface of coating 157 is within one or two thousandths of an inch of its predetermined FIG. 12 position, and may also be used to control the transport means for strip 154 and/or any other related apparatus. The other fringe lines 15a, 15b, etc., can be used for other purposes.

From the above-description it will be readily seen that the apparatus described in connection with FIGS. 12–15 may be used in various precise monitoring and/or measuring applications. For example individual objects such as machined parts may be successively moved with or along datum guide surface 152 of FIG. 12 and each such object in turn dimensionally checked as respects the location of one of its surfaces that is capable of reflecting the acoustical waves from said wave generating means 30.

The acoustical frequencies to which the laminar fluid flow in fluid amplifier 72 is sensitive are of course those that are present in the acoustical waves generated by said whistle 30. One such frequency of approximately 50,000 Hertz has been found to be very practical from the standpoint of making the parts of units 30, and 31 relatively small as above described, and also from the standpoint of permitting the device 31 to be insensitive to most "noise"

and the relatively low random frequencies that are normally present in most situations where machinery is present. This latter condition permits apparatus such as that described in connection with FIGS. 12–15 to be efficiently used in most any control or power environment.

I claim:
1. An acoustical sensing system comprising:
   acoustical wave generating means for directing high frequency acoustical waves towards a surface so that the incident and reflected waves to and from said surface mutually interfere and thus establish a pattern of acoustical interference fringes;
   acoustically sensitive means adapted to be switched between two operative conditions by the presence and absence respectively of said high frequency acoustical waves; and
   mounting means for positioning said acoustically sensitive means relative to said surface and said wave generating means so as to be capable of being switched between said two operative conditions by the presence and absence respectively of one of said interference fringes.

2. Apparatus as defined by claim 1 wherein said acoustically sensitive means includes a turbulence type fluid amplifier that utilizes a laminar fluid jet.

3. Apparatus as defined by claim 1 wherein acoustical wave generating means includes a whistle means that is adapted to generate acoustical waves having ultra-sonic frequencies.

4. Apparatus as defined by claim 1 wherein said acoustical wave generating means is adapted to establish two interfering sets of waves that are substantially 180 degrees out of phase.

5. An acoustical interferometer comprising:
   an acoustical wave generating means adapted to establish two interfering sets of coherent high frequency acoustical waves in accordance with a surface to be sensed, said sets of waves producing in the region adjacent said surface a plurality of acoustical interference fringes;
   acoustically sensitive means operable in response to said high frequency acoustical waves; and
   means for operatively mounting said acoustically sensitive means in predetermined orientation so that said acoustically sensitive means is effectively located along one of said fringes when said surface is in a predetermined position.

6. Apparatus as defined by claim 5 wherein said acoustically sensitive means includes a turbulence type fluid amplifier adapted to issue a laminar jet of fluid, and wherein said acoustically sensitive means affords said one fringe access to the fluid jet in said amplifier.

7. Apparatus as defined by claim 6 wherein said generating means includes a whistle means that is capable of generating acoustical waves having ultra-sonic frequencies.

8. Apparatus as defined by claim 7 wherein conduit means are provided whereby others of said fringes are effectively prevented from operatively reaching said jet of fluid in said amplifier.

9. Apparatus as defined by claim 5 wherein said acoustical wave generating means includes a means for directing high frequency acoustical waves towards said surface, the incident and reflected waves to and from said surface effectively defining said two interfering sets of waves.

10. An acoustical interferometer comprising:
    a whistle means adapted to generate high frequency acoustical waves and to direct said waves against a surface to be sensed, the incident and reflected waves to and from said surface thus effectively defining two interfering sets of coherent acoustical waves, said interfering sets of waves thereby establishing a plurality of interference fringes in the region adjacent said surface; and
    an acoustically sensitive device mounted so as to be effectively controlled by a predetermined one of said fringes.

11. Apparatus as defined by claim 10 wherein said acoustically sensitive device includes a turbulence type fluid amplifier that in operation utilizes a laminar jet of fluid that is adapted to be exposed to said predetermined one of said fringes.

12. An acoustical sensing device comprising:
    acoustical wave generating means adapted to establish a particular series of acoustical interference fringes in accordance with a predetermined position of a surface to be sensed;
    acoustically sensitive means adapted to be controlled by said interference fringes; and
    means for mounting said acoustically sensitive means in a predetermined orientation relative to said surface and said wave generating means so that said acoustically sensitive means is operatively controlled by a predetermined one of said interference fringes and thus indicates when said surface is substantially in said predetermined position.

13. Apparatus as defined by claim 12 wherein said acoustical wave generating means includes a single wave generator that is adapted to direct said waves towards said surface, the waves incident to and reflected from said surface being coherent and substantially 180 degrees out of phase thereby establishing said acoustical interference fringes.

14. Apparatus as defined by claim 13 wherein said wave generating means includes a whistle means that is capable of generating acoustical waves having ultra-sonic frequencies, and wherein said acoustically sensitive means includes a turbulence type fluid amplifier that is adapted to utilize a laminar fluid jet.

15. An acoustical interferometer comprising:
    a frame;
    a guide block mounted on said frame, said guide block having a datum surface associated therewith and past which an object to be sensed may be moved;
    a high frequency acoustical wave generator mounted on said frame in a predetermined orientation relative to said surface and adapted to direct acoustical waves toward said object passing said surface, the acoustical waves incident to and reflected from said object defining a set of coherent interfering acoustical waves that establish a predetermined pattern of acoustical fringes; and
    acoustically sensitive means mounted on said frame in predetermined orientation relative to said fringe pattern so as to be effectively disposed along a predetermined one of said fringes whereby said acoustically sensitive device may be operated when said object is placed on said guide surface, said acoustically sensitive means including at least one turbulence type fluid amplifier that utilizes a normally laminar jet of fluid that is operatively exposed to said predetermined fringe.

16. A method of determining when a surface of an object is in a predetermined location comprising the steps of:
    establishing a pattern of interfering acoustical waves in accordance with a predetermined location of said surface of said object, said interfering acoustical waves creating at least one interference fringe of known position; and
    acoustically sensing for the presence of said one interference fringe at said known position so as to thereby determine when said object surface is in said predetermined location.

17. The method defined by claim 16 wherein said acoustical interference fringe is created by directing said acoustical waves from a predetermined location towards said surface, the waves thus incident to and reflected from said surface being substantially coherent and 180 degrees out of phase and thus creating said fringe.

18. An acoustical sensing system comprising:

an acoustical wave generating means including a whistle means adapted to establish two interfering sets of coherent high-frequency acoustical waves, said interfering sets of waves establishing a plurality of acoustical interference fringes;

acoustically sensitive means operable in response to said high frequency acoustical waves; and means for operatively mounting said acoustically sensitive means so that said acoustically sensitive means may be effectively controlled by one of said acoustical interference fringes.

19. Apparatus as defined by claim 18, wherein said two interfering sets of coherent high frequency acoustical waves are established by a single whistle means and a cooperating wave reflecting surface.

20. Apparatus as defined by claim 18 wherein said acoustically sensitive means includes a turbulence type fluid amplifier.

21. Apparatus as defined by claim 18 wherein said mounting means is adapted to locate said acoustically sensitive means so as to be effectively disposed along a predetermined one of said interference fringes.

22. An acoustical sensing system comprising:

an acoustical wave generating means adapted to establish two interfering sets of coherent high-frequency acoustical waves, said interfering sets of waves establishing a plurality of acoustical interference fringes;

acoustically sensitive means including a turbulence type fluid amplifier operable in response to said high frequency acoustical waves; and means for operatively mounting said acoustically sensitive means so that said acoustically sensitive means may be effectively controlled by one of said acoustical interference fringes.

23. Apparatus as defined by claim 22 wherein said mounting means is adapted to locate said acoustically sensitive means so as to be effectively disposed along a predetermined one of said interference fringes.

24. Apparatus as defined by claim 22 wherein said two interfering sets of coherent high frequency acoustical waves are established by a single whistle means and a cooperating wave reflecting surface.

References Cited

UNITED STATES PATENTS

| | | | |
|---|---|---|---|
| 3,400,363 | 9/1968 | Silverman | 340—3 |
| 3,003,239 | 10/1961 | Weidner et al. | 181—0.5 |
| 3,398,758 | 8/1968 | Unfried | 137—81.5 |
| 3,413,996 | 12/1968 | Fine | 137—81.5 |
| 3,423,990 | 1/1969 | Martin | 137—81.5 |

OTHER REFERENCES

Applied Physics Letters, volume 9, number 9, entitled "Sound Holograms and Optical Reconstruction," pp. 328 and 329 dated Nov. 1, 1966.

BENJAMIN A. BORCHELT, Primary Examiner

T. H. WEBB, Assistant Examiner

U.S. Cl. X.R.

137—81.5